United States Patent [19]

Lamberti et al.

[11] 4,015,023

[45] Mar. 29, 1977

[54] FOODS WITH SUBSTITUTED SUCCINIC ACID COMPOUNDS

[75] Inventors: Vincent Lamberti, Upper Saddle River; Warren J. Urban, River Vale, both of N.J.

[73] Assignee: Lever Brothers Company, New York, N.Y.

[22] Filed: Apr. 14, 1975

[21] Appl. No.: 567,789

Related U.S. Application Data

[63] Continuation-in-part of Ser. No. 475,008, May 31, 1974, abandoned, which is a continuation-in-part of Ser. No. 373,339, June 25, 1973, abandoned.

[52] U.S. Cl. .............................. 426/531; 426/534; 426/536; 426/590; 426/597; 426/599; 426/602; 426/650; 426/658

[51] Int. Cl.$^2$ ........................................ A23L 1/226

[58] Field of Search ................. 260/535 P; 426/534, 426/531, 536, 590, 597, 599, 602, 650, 658

[56] References Cited

UNITED STATES PATENTS 3,914,297  10/1975  Lamberti et al. ............. 260/535 P

*Primary Examiner*—Joseph M. Golian
*Attorney, Agent, or Firm*—James J. Farrell; Melvin H. Kurtz; Kenneth F. Dusyn

[57] ABSTRACT

Certain substituted succinic acid compounds, particularly carboxymethyloxysuccinic acid and lactoxysuccinic acid and salts thereof are incorporated as an additive in edible materials, particularly food products. The compounds act as acidulating agents and buffering agents in food products; and the acid forms also impart a pleasant tart taste thereto. In addition, these acids and salts are essentially non-nutritive and non-caloric.

9 Claims, No Drawings

FOODS WITH SUBSTITUTED SUCCINIC ACID COMPOUNDS

This application is a continuation-in-part of application Ser. No. 475,008, filed May 31, 1974 and now abandoned which in turn was a continuation-in-part of application Ser. No. 373,339, filed June 25, 1973 and now abandoned.

This invention relates in general to the art of food additives. More particularly, the invention is concerned with the use of certain substituted succinic acid compounds as food additives.

One of the most widely used acidulating and buffering agents for food is citric acid. Nearly all of the citric acid produced commercially is prepared by fermentation which is a costly and complicated process. Although synthetic methods for preparing citric acid have been reported in both the technical and patent literature, none of these methods have been commercialized. Very few practical synthetic substitutes for citric acid, as food acidulants, have appeared because of the difficulty of achieving complete safety in these materials. If a substance were to be found which was either not metabolized or not absorbed from the gut of the ingesting primate species, or if such a substance had both properties, this material would have an improved chance of succeeding as a food acidulant substitute from a safety point of view. In addition, such a substance would be advantageous in that it would be non-nutritive and/or non-caloric in character. In contrast, citric acid as well as other natural food acidulating acids are readily metabolized in most mammalian species and thus add caloric value to any food to which they are added. Thus, a need exists for an economic acidifying-buffering agent which can be prepared from readily available starting materials and which is non-nutritive and/or non-caloric.

It has been discovered that certain substituted succinic acid compounds, particularly carboxymethyloxysuccinic acid, lactoxysuccinic acid, and the alkali metal and alkaline earth metal, for example calcium and magnesium, and ammonium salts thereof, are excellent acidulating agents and buffering agents; the acid form of the compounds also impart a pleasant tart taste to food products. Further, neither the acid nor the salt form of these compounds is significantly metabolized in man and primates. Nearly all of these compounds are excreted via the faces in both species and essentially all of that portion which is not excreted in this matter is found in the urine without having been metabolized. In contrast, considerable absorption and metabolism of these compounds occurs in the rat. Thus, compared to citric acid, which is known to be metabolized in all species of life utilizing the Krebs cycle, these compounds surprisingly are neither significantly absorbed nor metabolized in the higher species of man and primates. The significance of this is that the acid as well as acid salt forms act as non-nutritive and non-caloric acidulating agents in foodstuffs whereas citric acid, the closest related acidulant is metabolized and adds caloric value to any food to which it is added. By non-nutritive is meant that the compound does not provide any caloric value to the diet of the organism ingesting the compound. For the purpose of this invention, the caloric value of a substance shall mean that amount of calories which an organism derives from the substance after ingestion thereof. Primate caloric value shall mean the caloric value when the above referred to organism is a primate.

A further point is that the non-absorption and non-metabolism of these compounds in man is highly desirable from a safety point of view especially for a synthetic material which is to be used in a foodstuff.

The substituted succinic acid compounds used in accordance with this invention are those corresponding to the following formula:

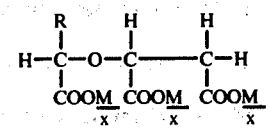

wherein R is hydrogen or methyl; M is hydrogen or an alkali metal, calcium, magnesium, or ammonium cation, and mixtures thereof and x is 1 or 2 and is equivalent to the valency of M. In the case of mono alkaline earth metal salts, i.e. calcium or magnesium it will be understood that two of the "M" designations represent the alkaline earth cation which is bivalent; thus, the mono calcium salt may be represented as follows:

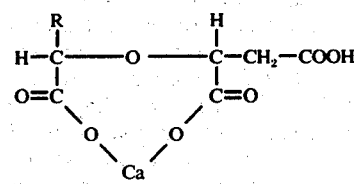

In the case of the tri alkaline earth metal salts, i.e. calcium or magnesium, it will be understood that three of these cations as above designated by M are combined with two molecules of the anionic species of the acid. Thus the tri magnesium salt may be represented as follows:

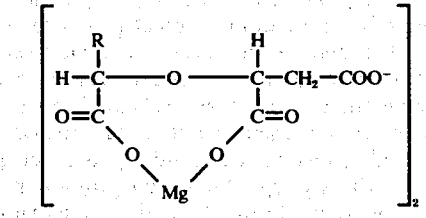

For convenience, in parts of the following description, the letters CMOS will be used to refer to the trisodium salt of carboxymethyloxysuccinic acid. CMOS acid refers to the acid form and in the metabolic studies CMOS species refers to both acid and salt forms regardless of the salt anion that may be present.

Typical of such materials are:
carboxymethyloxysuccinic acid;
mono-, di-, and tri-sodium salts of carboxymethyloxysuccinic acid;
mono-, di-, and tri-potassium salts of carboxymethyloxysuccinic acid;
mono-, di-, and tri-lithium salts of carboxymethyloxysuccinic acid;
mono-, di-, and tri-ammonium salts;
mono-sodium di-potassium salt of carboxymethyloxysuccinic acid;

di-sodium mono-potassium salt of carboxymethyloxysuccinic acid;

mono-calcium and tri-calcium salts of carboxymethyloxysuccinic acid;

mono-magnesium and tri-magnesium salts of carboxymethyloxysuccinic acid;

calcium mono-sodium salt of carboxymethyloxysuccinic acid;

mono-, di-, and tri-ammonium salts of lactoxysuccinic acid;

mono-, di-, and tri-sodium salts of lactoxysuccinic acid;

mono-, di-, and tri-potassium salts of lactoxysuccinic acid;

mono-, di-, and tri-lithium salts of lactoxysuccinic acid;

mono-sodium di-potassium salt of lactoxysuccinic acid;

mono-calcium salt of lactoxysuccinic acid;

di-sodium mono-potassium salt of lactoxysuccinic acid;

mono- and tri-calcium salts of lactoxysuccinic acid;

mono- and tri-magnesium salt of lactoxysuccinic acid;

calcium mono-sodium salt of lactoxysuccinic acid;

mono-, di- and tri-ammonium salts.

Of course, it is to be understood that the compounds which can be employed in the present invention may be available in both the anhydrous and hydrated form.

As noted above, the carboxymethyloxysuccinic acid and lactoxysuccinic acid compounds of this invention are substantially non-nutritive, are excellent acidulating agents and also impart a pleasant tart taste to food products. These compounds are soluble in water and are stable in aqueous solution. As s result, they are useful for imparting tartness to all types of materials which are intended for consumption or at least herein generically designated as edible materials. Typical illustrative examples of edible materials in which carboxymethyloxysuccinic acid and lactoxysuccinic acid compounds can be incorporated to impart a tart taste are: fruits; vegetables; juices, or other liquid preparations made from fruits or vegetables; meat products; salad dressings, pickles and relishes; ice creams, sherbets and ices; ice milk products; fish products, icings; confections and confection toppings, syrups, and flavors; cake and pastry mixes; beverages such as carbonated soft drinks, fruit ades, instant tea; candy, jellies and preserves; wines; dietary-type foods, cough syrups and other medicinal preparations intended for oral administration tobacco products; adhesives for gumming stamps, envelopes and labels, etc.

In using the carboxymethyloxysuccinic acid and lactoxysuccinic acid compounds as food additives in this invention, they are incorporated in the edible material in an effective amount in essence a flavor enhancing amount, i.e., the amount required to attain the desired level of tartness, flavor, etc. For instance, they are generally used in a concentration of about 0.001% by weight to about 1% by weight when employed as an acidulating agent in edible products. When the compounds are employed in food products to impart tartness or flavor to edible products, from about 0.01% to about 10% is incorporated into the product. It is obvious, however, that there is nothing critical about the concentration of the carboxymethyloxysuccinic acid and lactoxysuccinic acid compounds which are used; it is simply a matter of attaining the desired effect appropriate to the material in question. Moreover, the technique of incorporating the carboxymethyloxysuccinic acid and lactoxysuccinic acid compounds in edible materials offers no difficulty as the selected compound is simply incorporated with the edible material. The additives of the present invention may be added directly to the material or they may be first incorporated with a diluent to increase their bulk so that small amounts of the compounds may be metered into the material. As diluents, one may use lquid or solid carriers such as water, ethanol, glycerol, starch, sorbitol, salt, sugar or other non-toxic substances compatible with the edible material.

Citric acid is one of the most widely used acidula agents for foods and is often considered as the standard for comparison in evaluating the effects of other acidulants in various food products. In comparison with citric acid, it has been found that carboxymethyloxysuccinic acid is a stronger acid than citric acid as shown in Table I.

Table I

| pH of Citric Acid and Carboxymethyloxysuccinic Acid Solutions | | |
|---|---|---|
| Concentration (m moles) | Carboxymethyloxysuccinic Acid pH | Citric Acid pH |
| 100 | 2.37 | 2.49 |
| 10 | 2.63 | 2.66 |
| 1 | 3.01 | 3.02 |

The dissociation constants for carboxymethyloxysuccinic acid at 25° C are $K_1 = 3 \times 10^{-3}$; $K_2 = 1.7 \times 10^{-4}$; and $K_3 = 1 \times 10^{-5}$. The dissociation constants reported for citric acid are $K_1 = 8.2 \times 10^{-4}$ $K_2 = 1.8 \times 10^{-5}$; and $K_3 = 3.9 \times 10^{-6}$. The dissociation constants are determined by standard techniques. As indicated by the dissociation constants for both acids, carboxymethyloxysuccinic acid is significantly much stronger acid than citric acid.

Carboxymethyloxysuccinic acid and lactoxysuccinic acid in combination with the corresponding alkali metal salts can also act as buffering agents in food products. Table II demonstrates the effectiveness of carboxymethyloxysuccinic acid in the consumption of base in the range of pH 3-9. This table also reports the corresponding consumption of base by citric acid.

Table II

| | 10 m Molar Solution (0.01 molar; 20 ml; 0.192% wt/vol) | | |
|---|---|---|---|
| To pH | Carboxymethyloxysuccinic Acid (meq of NaOH) | Citric Acid (meq of NaOH) | meq NaOH (carboxymethyloxysuccinic acid) meq NaOH (citric acid) |
| 3.0 | 0.155 | 0.102 | 1.52[a] |
| 3.5 | 0.240 | 0.183 | 1.31 |
| 4.0 | 0.333 | 0.245 | 1.36[b] |
| 4.5 | 0.414 | 0.320 | 1.29 |
| 5.0 | 0.487 | 0.387 | 1.26[c] |
| 5.5 | 0.553 | 0.447 | 1.24 |
| 6.0 | 0.593 | 0.512 | 1.16 |

Table II-continued

| To pH | 10 m Molar Solution (0.01 molar; 20 ml; 0.192% wt/vol) | | meq NaOH (carboxymethyl-oxysuccinic acid) meq NaOH (citric acid) |
|---|---|---|---|
| | Carboxymethyloxy-succinic Acid (meq of NaOH) | Citric Acid (meq of NaOH) | |
| 6.5 | 0.610 | 0.561 | 1.09 |
| 7.0 | 0.615 | 0.586 | 1.05 |
| 8.0 | 0.621 | 0.599 | 1.04 |
| 9.0 | 0.624 | 0.602 | 1.04 |

*Carboxymethyloxysuccinic acid takes up 52% more base than citric acid to reach pH 3.0
*Carboxymethyloxysuccinic acid takes up 36% more base than citric acid to reach pH 4.0
*Carboxymethyloxysuccinic acid takes up 26% more base than citric acid to reach pH 5.0

Similar results are obtained with lactoxysuccinic acid.

From the data presented in Table II, it can be seen that when the salts of carboxymethyloxysuccinic acid are used in a buffer system, they have a greater capacity than the corresponding citrate salts to maintain the pH of the composition.

The solubility of carboxymethyloxysuccinic acid in both water and organic solvents is unexpected in comparison to citric acid. Saturated solutions of both acids were prepared at room temperature (~23°–25° C) and reported in the following table.

Table III

| Solubility of Carboxymethyloxysuccinic Acid and Citric Acid at Room Temperature | | |
|---|---|---|
| Solvent | Carboxymethyloxysuccinic Acid | Citric Acid |
| Water | 73% | 63% |
| Ethyl Ether | 12% | 1% |
| Amyl Acetate | 15% | 4% |

It is especially significant to note and indeed quite surprising that the solubility of CMOS in comparison to citric acid ranges from 1100 percent as great in ethyl ether which is relatively non-polar to about 16 percent as great in water which is highly polar. The increased solubility of CMOS in comparison to citric acid in both water and organic solvents is entirely unexpected. This increased solubility of carboxymethyloxysuccinic acid in both water and organic solvents, thus, permits greater utilization of this acid over citric acid in food compositions where both aqueous and organic components are generally present.

The substituted succinic acid compounds employed in the present invention can be prepared by known methods (see U.S. 3,692,685 and German Offen. 2,220,295, as well as U.S. patent applications corresponding to Ser. Nos. 139,229 and 274,954 all of which are assigned to the assignee hereof which are incorporated herein by reference). In one known technique, carboxymethyloxysuccinic acid is prepared by the reaction of a mixed alkaline earth metal salt such as the calcium salts of maleic acid and glycolic acid in an aqueous alkaline medium. The pH of the medium should be adjusted with an alkaline earth metal reagent such as calcium hydroxide, strontium hydroxide or barium hydroxide.

It has been found that when the reaction is carried out at a pH range of 10.5 to 12 as measured initially at room temperature (about 25° C) yields of about 80–95% carboxymethyloxysuccinate are obtained in a few hours or less. When the reaction is carried out at a preferred pH of about 11.3 to 12.0 as measured initially at room temperature which corresponds to about 9.9 to 10.3 at 100° C, yields of 90% or better are obtained in less than two hours.

The mole ratio of glycolic cid to maleic acid used in the reaction is from about 1:1 to about 2:1 and preferably from 1.05:1 to about 1.2:1. The temperature at which the reaction may be carried out is normal reflux temperature (100°–102° C) or below reflux temperature say, 60° C. However, if the reaction is carried out at temperatures above reflux temperature, 102°–200° C, the rate of reaction is increased so that at certain elevated temperatures the reaction may be completed within a matter of minutes.

Isolation of the free acid from the reaction mixture is accomplished by isolating the alkaline earth metal salt of carboxymethyloxysuccinic acid and passing an aqueous solution or slurry of the salt over an ion-exchange column in its acid form. The free acid can also be isolated from the reaction mixture by first forming the alkali metal salt, such as the trisodium salt, and then passing an aqueous solution or slurry of the salt over an ion-exchange resin in its acid form.

Lactoxysuccinic acid, also known as (1-carboxyethoxy) succinic acid, is prepared by substituting lactic acid in place of glycolic acid in the above procedure.

The mono- and di-alkali metal salts of carboxymethyloxysuccinic acid and lactoxysuccinic acid can be prepared by neutralizing the free acid using a stoichiometric quantity of the appropriate alkali metal reactant. The mixed salts of the substituted succinic acids employed in this invention can be prepared by neutralizing the free acid with the requisite proportional amounts of basic compounds containing the desired cations. When ammonium salts are desired, the free acid is neutralized with ammonium hydroxide.

Alkaline earth metal salts, such as calcium and magnesium, can be prepared by reacting the required amount of the alkaline earth metal hydroxide to form the mono-calcium or mono-magnesium salt in which there is one free carboxyl group or the tri-calcium or tri-magnesium salt formed from two molecules of the acid and three molecules of the alkaline earth metal hydroxide.

The following examples are set forth as illustrative of the instant invention and should be in no way construed as limitative of the scope thereof.

EXAMPLE I

A. CMOS metabolism studies performed in one man and one rhesus monkey reveal that following administration of a single oral dose, CMOS species are eliminated primarily via the gastro-intestinal system and secondarily by way of the urinary tract. The presence of CMOS species exclusively in the excreta examined indicates that the test compound is not metabolized by the man or monkey under investigation.

B. Two adult male human volunteers are each given a single 500.0 mg dose of CMOS acid contained in a fruit drink. Following dosing, urines are collected for a total of approximately 53 hours and screened for the presence of CMOS species and/or possible metabolites. Paper chromatographic analysis demonstrates the presence of CMOS species and oxalic acid in the urine specimens of both individuals. Quantitation of CMOS species by a beta-naphthol assay, J. Am. Oil Chem. Soc. Vol. 50 p. 213, 1973, reveals totals 2.63% of the administered doses in subjects 1 and 2 respectively (Table IV). Further, these amounts are observed to be eliminated within 24 hours following administration. Precipitation and spectrophotometric quantitation of oxalic acid shows no significant differences in urinary oxalic acid content between control and test specimens in either subject under investigation.

TABLE IV

URINARY EXCRETION OF CMOS SPECIES FOLLOWING ORAL ADMINISTRAION TO THE HUMAN*

| Time | Percent of Administered Dose | |
|---|---|---|
| | Subject No. 1 | Subject No. 2 |
| 24 hr. | 2.63 | 3.51 |
| 48 hr. | 0.00 | 0.00 |
| 72 hr. | 0.00 | 0.00 |
| Total | 2.63 | 3.51 |

*Subjects received a single 500.0 mg dose of CMOS acid contained in a fruit drink vehicle.

This data serves to indicate the secondary role of the urinary tract in elimination of CMOS species, and the lack of metabolic breakdown of the test material by the subjects under study. The compounds of this invention are thus seen to be essentially or substantially non-nutritive to primates.

EXAMPLE 2

Two adult rhesus monkeys (one male and one female) are administered by gastric intubation a single 0.1 g/kg dose of $^{14}$C-CMOS. Subsequently, urine and feces are collected for a total of 72 hrs and monitored for the presence of the carbon-14 label. Radioactively labeled material is recovered from excreta of the test animals and assayed for CMOS and/or possible metabolites. Results obtained (Table V) reveal the primary route of elimination of the administered isotope is via the gastro-intestinal system, as evidenced by the presence of an average of 69.06% of the initial dose in the excreted feces at the end of 72 hrs. Additionally, an average of 24.91% is recovered in the intestinal contents at the end of the experimental time period employed. The urinary tract is observed to play a secondary role in the excretion of the carbon-14 label, indicated by the presence of an average of 5.92% of the dose in the urine 72 hr post-administration. There are no differences in excretion patterns due to sex differences. Radioactive material recovered from urine and alkaline extracts of feces is subjected to descending paper chromatography in three separte solvent systems as set forth by J. B. Stark, A. E. Goodban and H. S. Owens in Analyt. Chem. 23 (3) 413–415 (1951) for citric acid. Radiochromatogram scanning and visualization with bromophenol blue demonstrates the presence of CMOS species exclusively in the excreta of the test animals.

TABLE V

DISTRIBUTION OF $^{14}$C-CMOS FOLLOWING ORAL ADMINISTRATION TO THE RHESUS MONKEY*

| | Percent of Administered Dose | | | |
|---|---|---|---|---|
| | Monkey 1♂ | | Monkey 2♀ | |
| Time | Urine | Feces | Urine | Feces |
| 24 hr. | 2.44 | N.S.** | 2.74 | 17.50 |
| 48 hr. | 4.30 | 27.79 | 1.12 | 17.37 |
| 72 hr. | 0.83 | 41.27 | 0.42 | 33.81 |
| G. I. Tract | | 23.83 | | 25.99 |
| Total Recovery | 7.57 | 92.89 | 4.28 | 94.67 |
| | 100.46 | | 98.95 | |

*Test animals received a single oral 0.1 g/kg dose of $^{14}$C-CMOS.
**No sample obtained at this time period.

The data obtained and presented in Table V indicates poor absorption and lack of metabolic breakdown of CMOS in the rhesus monkey.

EXAMPLE 3

One male rhesus monkey is administered by gastric intubation one 0.10 g/kg dose of $^{14}$C-CMOS. Urine and feces are collected and assayed for the presence of radioactivity at 24 hr intervals for a total of 72 hrs. Additionally, blood samples are taken at 1, 2, 3, 4, 24, 48 and 72 hr intervals and monitored for the presence of the carbon-14 label.

Results reveal that the primary route of elimination of the administered isotope is via the gastro-intestinal tract, as evidenced by the presence of 46.71% of the radioactivity in the excreted feces at the end of 72 hrs. An additional 45.10% of the dose is discovered in the intestinal contents at the end of the experimental time period employed. The urinary tract plays a secondary role in the excretion of the carbon-14 label, indicated by the presence of 2.69% of the dose in the urine 72 hr post-administration. Blood samples taken at various time intervals after dosing contain similar amounts of radioactivity, indicating slow, fairly constant absorption of the radioactive material.

This experiment indicates that CMOS is poorly absorbed from the gut of the test animal. The radioactive label is observed to be eliminated primarily via the gastro-intestinal system, and secondarily by way of the urinary tract.

EXAMPLE 4

Preparation of Carboxymethyloxysuccinic Acid

Maleic anhydride (0.2 mole; 19.6 g) is dissolved in water (100 ml) at room temperature and stirred for 10–15 minutes to convert it to the acid. Glycolic acid (0.24 mole; 18.3 g) is then added and dissolved with stirring. Calcium hydroxide, (ca 0.36 mole; 27 g), sufficient to attain a pH of 11.4 as measured initially at 25° C is next added while stirring the reaction mixture vigorously. The mixture is heated to reflux and maintained at reflux for two hours while stirring vigorously. After cooling to 60° C, finely ground sodium carbonate (0.4 mole; 42.4 g) is added and stirring continued for fifteen minutes at 60° C. The mixture is then cooled to room temperature and the suspended $CaCO_3$ filtered off and washed with water. The filtrate (including the washings) contains the product, trisodium carboxymethyloxysuccinate, in yields of about 95% as determined by NMR analysis. The trisodium salt is purified by recrystallizing from 80% (by volume) alcohol-water. The recrystallized trisodium salt (pentahydrate) is dissolved in water and then passed through a cationexchange resin in its acid form. The column was washed with distilled water until the eluate is neutral. The combined eluate is evaporated in vacuo. The residue of carboxymethyloxysuccinic acid solidifies on cooling to a crystalline mass, m.p. 112°–113° C. The acid is then converted into an appropriate salt by partial or complete neutralization with sodium hydroxide or potassium hydroxide to form the mono-, di- or trisodium or potassium carboxymethyloxysuccinate. The ammonium salt is prepared in a similar manner employing ammonium hydroxide. The calcium and magnesium salts are prepared similarly by employing calcium hydroxide or magnesium hydroxide.

Lactoxysuccinic acid, also known as (1-carboxyethoxy) succinic acid, is prepared by the same procedure as above, with the exception that lactic acid is employed in place of glycolic acid. Higher yields of lactoxysuccinic acid are obtained by running the reaction of a pH of 12.0 instead of 11.4.

The "Absolute Threshold Value" and "Recognition Threshold Value" of carboxymethyloxysuccinic acid and citric acid were determined by a panel of 8 members. The "Absolute Threshold Value" is defined as the least concentration at which a detectable difference due to the presence of a solute in water is observed. The range of values reported by the panelists for the absolute threshold value for citric acid is 0.009–0.027% by weight and for carboxymethyloxysuccinic acid, 0.003–0.027% by weight. Similar results are obtained for lactoxysuccinic acid. The "Recognition Threshold Value" is defined as the concentration at which one can identify a taste. The range of values reported by the panelists for the recognition threshold value for citric acid is 0.027–0.243% by weight and for carboxymethyloxysuccinic acid 0.027–0.081% by weight; in both instances the panelists recognized a sour taste.

When tested by a panel of 30 members comparing equal concentration, i.e., 0.1% by weight aqueous solution of carboxymethyloxysuccinic acid and citric acid, carboxymethyloxysuccinic acid had a significantly much more tart taste than citric acid. In a second panel of 30 members, it was found that a 0.075% by weight aqueous solution of carboxymethyloxysuccinic acid was judged to be equivalent to a 0.1% solution of citric acid. Similar results are obtained for lactoxysuccinic acid.

EXAMPLE 5

An Orange Juice Mix is prepared according to the following formula:

| | |
|---|---|
| Orange juice flavor | 5 g |
| Sugar | 180 g |
| Carboxymethyloxysuccinic acid | 20 g |

An intimate blend of the above ingredients is prepared by thoroughly mixing the three components. Then 17 g of the above mix is dissolved in 240 ml water. The product possessed a pleasant, acceptable taste typical of this type of drink. When lactoxysuccinic acid is used in place of carboxymethyloxysuccinic acid a similar product is obtained.

EXAMPLE 6

A mayonnaise is prepared according to the following formula:

| | |
|---|---|
| 1 egg | 55 grams |
| Wesson oil | 210 grams |
| Cider vinegar | 22 grams |
| Water | 7 grams |
| Carboxymethyloxysuccinic acid | 0.375 grams |
| Salt | 1 grams |

Add the egg to a Waring Blender and slowly add the oil with agitation. After emulsifying the mixture, the remaining ingredients are added. The product has a typical mayonnaise flavor and is comparable to one in which lemon juice or citric acid replaces part of the vinegar commonly used. When lactoxysuccinic acid is used in place of carboxymethyloxysuccinic acid a similar product is obtained.

EXAMPLE 7

A table syrup is prepared according to the following formula:

| | Percent By Weight |
|---|---|
| Liquid sugar | 44 |
| Corn syrup, 42 Dextrose Equivalent | 50 |
| Salt (sodium chloride) | 0.1 |
| Trisodium carboxymethyloxysuccinate | 0.067 |
| Sodium benzoate | 0.1 |
| Propylene glycol alginate | 0.4 |
| Carmel color | 0.044 |
| Butter | 2.0 |
| Maple flavor | 0.12 |
| Carboxymethyloxysuccinic acid | 0.025 |
| Water to 100% | |

The liquid sugar is added to a mix tank and heated between 110°–120° F. The salt, trisodium carboxymethyloxysuccinate, and sodium benzoate are added to 150° F water and then added to the mix tank. Carboxymethyloxysuccinic acid is added to adjust the pH to 5.3. The propylene glycol alginate is dispersed slowly into the mix tank. The mixture is maintained at 110°–120° F while the corn syrup is dissolved therein. After the caramel color is added, carboxymethyloxysuccinic acid is added to adjust the pH to 5.0. The melted butter and maple flavor are added and the composition mixed and cycled through a colloid mill at a temperature of 110°–120° F and then to a pasteurizer exiting at 160°–170° F. The mixture is then passed to an homogenizer, wherein it is homogenized at 3000 p.s.i.g. first stage and 500 p.s.i.g. second stage. The homogenized material is filled into bottles at 160°–170° C, capped and cooled with water.

When citric acid is employed in adjusting the pH during the process, 0.033 percent by weight of citric acid is required to obtain the desired pH.

EXAMPLE 8

A hard candy is prepared according to the following formula:

| | |
|---|---|
| Cherry fruit flavorings | 1 gram |
| Carboxymethyloxysuccinic acid | 1 gram |
| Sugar | 98 grams |

A molten solution of the sugar in water is prepared by heating the two components to 300° F to remove excess water. The flavoring agent and carboxymethyloxysuccinic acid are then added to the molten sugar and cast into molds which is allowed to solidify by cooling, The resulting candy product has a pleasant tart cherry taste. When lactoxysuccinic acid is used in place of carboxymethyloxysuccinic acid a similar product is obtained.

EXAMPLE 9

A lemon flavored instant tea mix is prepared according to the following formula:

| Instant Tea | 1.0 gram |
|---|---|
| Lemon Flavor | 0.39 gram |
| Caramel Color | 0.05 gram |
| Sugar | 45 gram |
| Carboxymethyloxysuccinic Acid | 0.60 grams |

A dry blend mix is prepared of the above ingredients and dissolved in 50 ml of water. A similar composition is prepared by replacing the carboxymethyloxysuccinic acid with citric acid. A taste panel found that both products have a high degree of acceptance as lemon flavored ice tea beverages and that the product containing carboxymethyloxysuccinic acid as an acidulent is almost indistinguishable from the product containing citric acid.

EXAMPLE 10

A lemon flavored instant tea mix is prepared according to the procedure of Example 6, however, 2.5 g of the monocalcium salt of carboxymethyloxysuccinic acid is added in place of 0.60 g of carboxymethyloxysuccinic acid. The product obtained has similar flavor properties.

The foregoing description of the present invention has been presented describing certain operable and preferred embodiments. It is not intended that the invention should be so limited, since variations and modifications thereof in view of the teachings herein, will occur to those skilled in the art. All of such variations and modifications are within the spirit and scope of this invention.

What is claimed is:

1. A method of imparting a tart taste to a food which comprises adding thereto a flavor enhancing amount of a compound having substantially no primate caloric value of the formula:

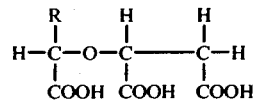

wherein R is hydrogen or methyl.

2. A method as defined in claim 1 wherein said compound is carboxymethyloxysuccinic acid.

3. A method as defined in claim 1 wherein said compound is lactoxysuccinic acid.

4. A method for adjusting the pH of a food which comprises adding thereto an amount effective to adjust said pH of a compound having substantially no primate caloric value of the formula:

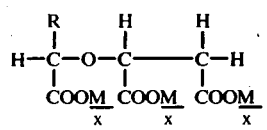

wherein R is hydrogen or methyl; M is hydrogen or an alkali metal cation or an alkaline earth metal cation selected from the group consisting of calcium and magnesium, or an ammonium cation and mixtures thereof and wherein x is 1 or 2 and is equivalent to the valency of M.

5. A method as defined in claim 4 wherein said compound is carboxymethyloxysuccinic acid.

6. A method as defined in claim 4 wherein said compound is lactoxysuccinic acid.

7. A composition comprising (a) a food and (b) a compound having substantially no primate caloric value of the formula:

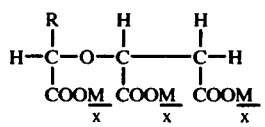

wherein R is hydrogen or methyl; M is hydrogen or an ammonium cation or an alkali metal cation or alkaline earth metal cations selected from the group consisting of calcium and magnesium and mixtures thereof and wherein x is 1 or 2 and is equivalent to the valency of M, said compound present in amounts effective to input a tart taste to adjust the pH.

8. A composition as defined in claim 7 wherein said compound is carboxymethyloxysuccinic acid.

9. A composition as defined in claim 7 wherein said compound is lactoxysuccinic acid.

* * * * *

UNITED STATES PATENT AND TRADEMARK OFFICE
CERTIFICATE OF CORRECTION

PATENT NO. : 4,015,023
DATED : March 29, 1977
INVENTOR(S) : Vincent Lamberti and Warren J. Urban It is certified that error appears in the above-identified patent and that said Letters Patent are hereby corrected as shown below:

Col. 1, line 49 - "faces" should be -- feces --.

Col. 3, line 35 - "As s" should be -- As a --;

Col. 3, line 51 - Insert -- ; -- after "tration".

Col. 4, line 26 - "acidula" should be -- acidulating --;

Col. 4, line 49 - Insert -- a -- before "significantly";

Col. 4 and Col. 5, Table 2 (heading) -

"meq NaOH (carboxymethyl-oxysuccinic acid) / meq NaOH (citric acid)" should be -- meq NaOH (carboxymethyl-oxysuccinic acid) / meq NaOH (citric acid) --

Col. 6, line 16 - "cid" should be -- acid --.

Col. 7, line 11 - delete "2.63%" and replace it with -- of 2.63% and 3.51% --;

Col. 7, line 62 - "separte" should be -- separate --.

Signed and Sealed this

Twenty-eighth Day of June 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,015,023
DATED : March 29, 1977
INVENTOR(S) : Vincent Lamberti and Warren J. Urban It is certified that error appears in the above-identified patent and that said Letters Patent are hereby corrected as shown below:

In the Claims:

Claim 7, Column 12, Line 50: "input" should be -- impart --.

Claim 7, Column 12, Line 50: following the word "taste", add the word -- or --.

Signed and Sealed this

Fourteenth Day of March 1978

[SEAL]

Attest:

RUTH C. MASON
Attesting Officer

LUTRELLE F. PARKER
Acting Commissioner of Patents and Trademarks